United States Patent
Khotimsky et al.

(10) Patent No.: US 12,328,538 B2
(45) Date of Patent: Jun. 10, 2025

(54) REMOTE STATUS INDICATORS FOR PLUGGABLE DEVICE

(71) Applicant: Verizon Patent and Licensing Inc., Basking Ridge, NJ (US)

(72) Inventors: Denis A Khotimsky, Westborough, MA (US); Gregory K Sherrill, Herndon, VA (US); Eugene DeFrancisci, Seaford, NY (US); Phillip S Myers, Flower Mound, TX (US); Rajesh Yadav, Ashland, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 168 days.

(21) Appl. No.: 18/127,034

(22) Filed: Mar. 28, 2023

(65) Prior Publication Data
US 2024/0334094 A1    Oct. 3, 2024

(51) Int. Cl.
*H04Q 11/00* (2006.01)
*H04L 43/0811* (2022.01)

(52) U.S. Cl.
CPC ...... *H04Q 11/0067* (2013.01); *H04L 43/0811* (2013.01); *H04Q 2011/0083* (2013.01); *H04Q 2213/13175* (2013.01)

(58) Field of Classification Search
CPC ....... H04Q 11/0067; H04Q 2011/0083; H04Q 2213/13175; H04L 43/0811
USPC .......................................................... 398/33
See application file for complete search history.

(56) References Cited

U.S. PATENT DOCUMENTS

| | | | | |
|---|---|---|---|---|
| 2003/0053170 | A1* | 3/2003 | Levinson | H04B 10/6911 398/139 |
| 2008/0270637 | A1* | 10/2008 | Cheah | G06F 13/4081 710/10 |
| 2012/0251100 | A1* | 10/2012 | Rope | H04B 10/40 398/25 |
| 2013/0202289 | A1* | 8/2013 | Tang | H04B 10/07 398/17 |
| 2015/0149677 | A1* | 5/2015 | Zhang | G06F 13/4081 710/302 |
| 2017/0242686 | A1* | 8/2017 | Vidyadhara | G06F 8/656 |
| 2017/0261674 | A1* | 9/2017 | Henry | G02B 6/0006 |
| 2019/0173577 | A1* | 6/2019 | Coffey | G02B 6/4292 |
| 2020/0120408 | A1* | 4/2020 | Boyd | H04L 41/0886 |
| 2023/0141514 | A1* | 5/2023 | Valdez | G02B 6/264 385/75 |

* cited by examiner

*Primary Examiner* — Dalzid E Singh

(57) ABSTRACT

An example method includes storing status data for a network communication device connected to a host device by a pluggable connector in a memory of the network communication device. A change in the status data is signaled using a signal on the pluggable connector. The status data is sent from the memory of the network communication device to the host device over the pluggable connector. The status data is displayed on a local indicator of the host device.

20 Claims, 5 Drawing Sheets

100

REMOTE STATUS INDICATORS FOR PLUGGABLE DEVICE

BACKGROUND

Network communication devices provide interconnections between different types of networks. For example, in a passive optical network (PON) an optical network unit (ONU) is an example network communication device. A PON is typically based on a point-to-multipoint (P2MP) optical fiber topology, known as an optical distribution network (ODN). An ODN uses fiber and passive components, such as splitters and combiners. A PON system uses the ODN to provide connectivity between a number of central nodes known as Optical Line Termination (OLTs) and a number of premises nodes (known equivalently as Optical Network Units (ONUs) or Optical Network Terminals (ONTs)) using bi-directional wavelength channels.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

According to some embodiments, a method includes storing status data for a network communication device connected to a host device by a pluggable connector in a memory of the network communication device, signaling a change in the status data using a signal on the pluggable connector, sending the status data stored in the memory of the network communication device to the host device over the pluggable connector, and displaying the status data on a local indicator of the host device.

According to some embodiments, a system includes a network communication device having a first memory, a first processor, and a first connector, and a host device having a local indicator, a second connector removably pluggable with the first connector, and a second processor, wherein the first processor is configured to store status data for the network communication device in the first memory, signal a change in the status data to the second processor using a signal on the first connector that is plugged to the second connector; and send the status data to the second processor over the first connector that is plugged to the second connector, and the second processor is configured to display the status data on the local indicator.

According to some embodiments, a network communication device includes a memory, an optical network interface, a pluggable connector implementing a host interface, and a processor configured to store status data for the network communication device in the memory, signal a change in the status data using a signal on the pluggable connector, and send the status data over the pluggable connector.

Figure 1:
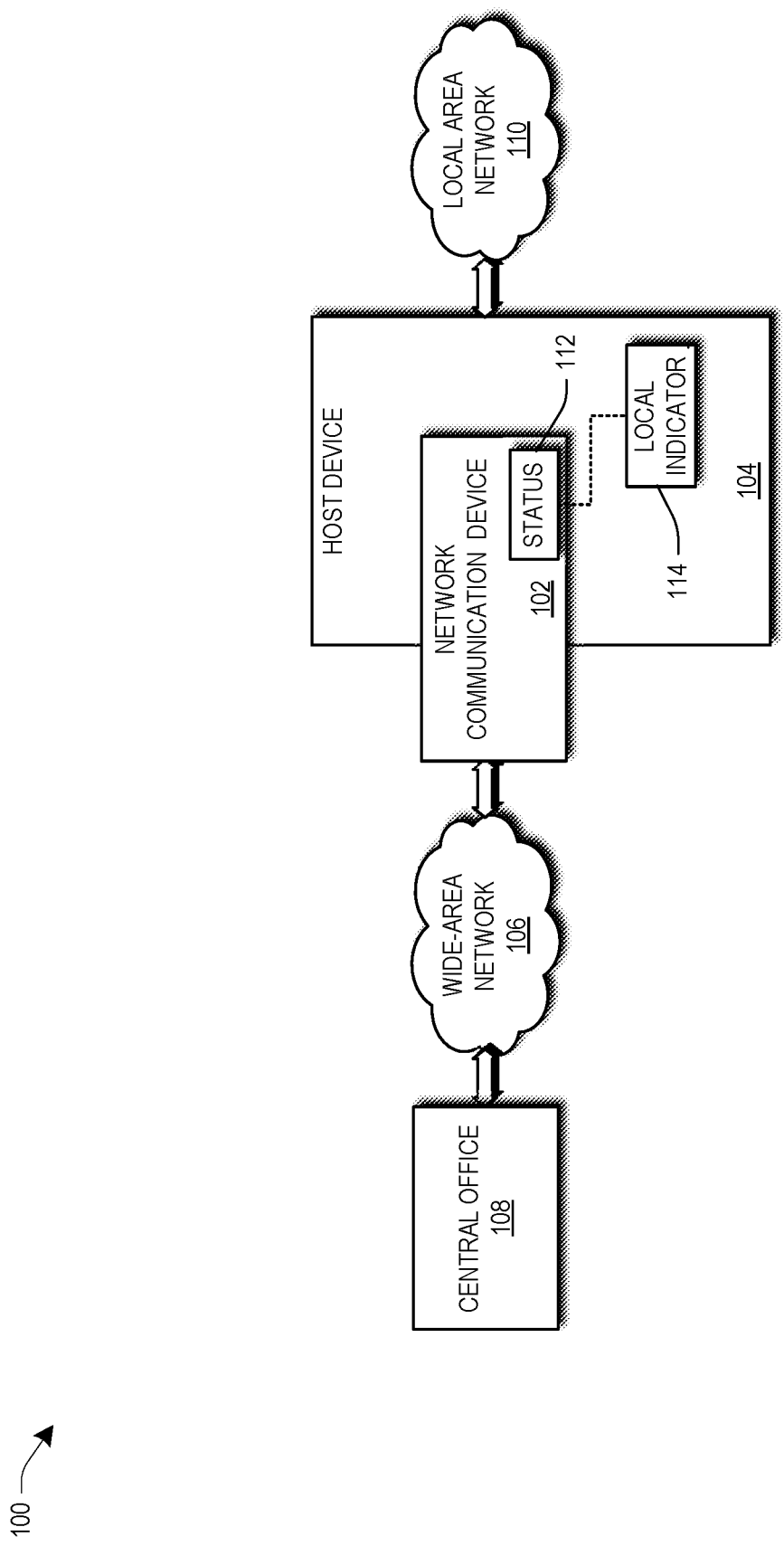
FIG. 1 is a diagram of a communication system, according to some embodiments.

FIG. 1 is a diagram of a communication system 100, according to some embodiments. The communication system 100 comprises a network communication device 102 interfacing with a host device 104 and communicating between a wide-area network 106, such as a PON, managed by a central office 108 and a local area network 110, such as an Ethernet network. The network communication device 102 executes a specialized software image supporting a network interface, such as an optical interface, and one or more host interfaces. The network communication device 102 operates to transcode communications between premises devices connected to the host device (and provided by the host device to the network communications device 102 through the host interfaces) and the wide-area network 106 connected to the network interface, typically according to a standard that has been promulgated for such transmissions (e.g., ITU-T G.983—B-PON, G.984—G-PON, G.987—XG-PON, G.989—NG-PON2). In some embodiments, the network communication device 102 may be employed to communicate with networks other than PON and Ethernet networks. In some embodiments, the network communication device 102 may be used with a time and wavelength division multiplexed (TWDM) PON system, such as NG-PON2, and the network communication device 102 may be capable of operating on a plurality of wavelength channels.

The network communication device 102 interfaces with the host device 104 using a pluggable connector. The pluggable connector provides a host-facing interface between the network communication device 102 and the host device 104. The host device 104 and the local area network 110 may be part of a customer premises served by the central office 108. The host device 104 may be a router, a modem, a security device, an access point, or some other device that provides communication between the local area network 110 and the wide-area network 106.

The network communication device 102 may comprise a small form factor pluggable (SFP) device, an SFP+ device, a 10 gigabit small form factor pluggable (XFP) device, a C form-factor pluggable (CFP) device, or other device. Due to the small size of the network communication device 102, local indicators are not provided on the housing of the network communication device 102 to indicate status information. In some embodiments, the network communication device 102 comprises the status memory 112, and the host device 104 reads the status memory 112 and activates a local indicator 114 to remotely provide the status of the network communication device 102, as further described herein.

Figure 2:
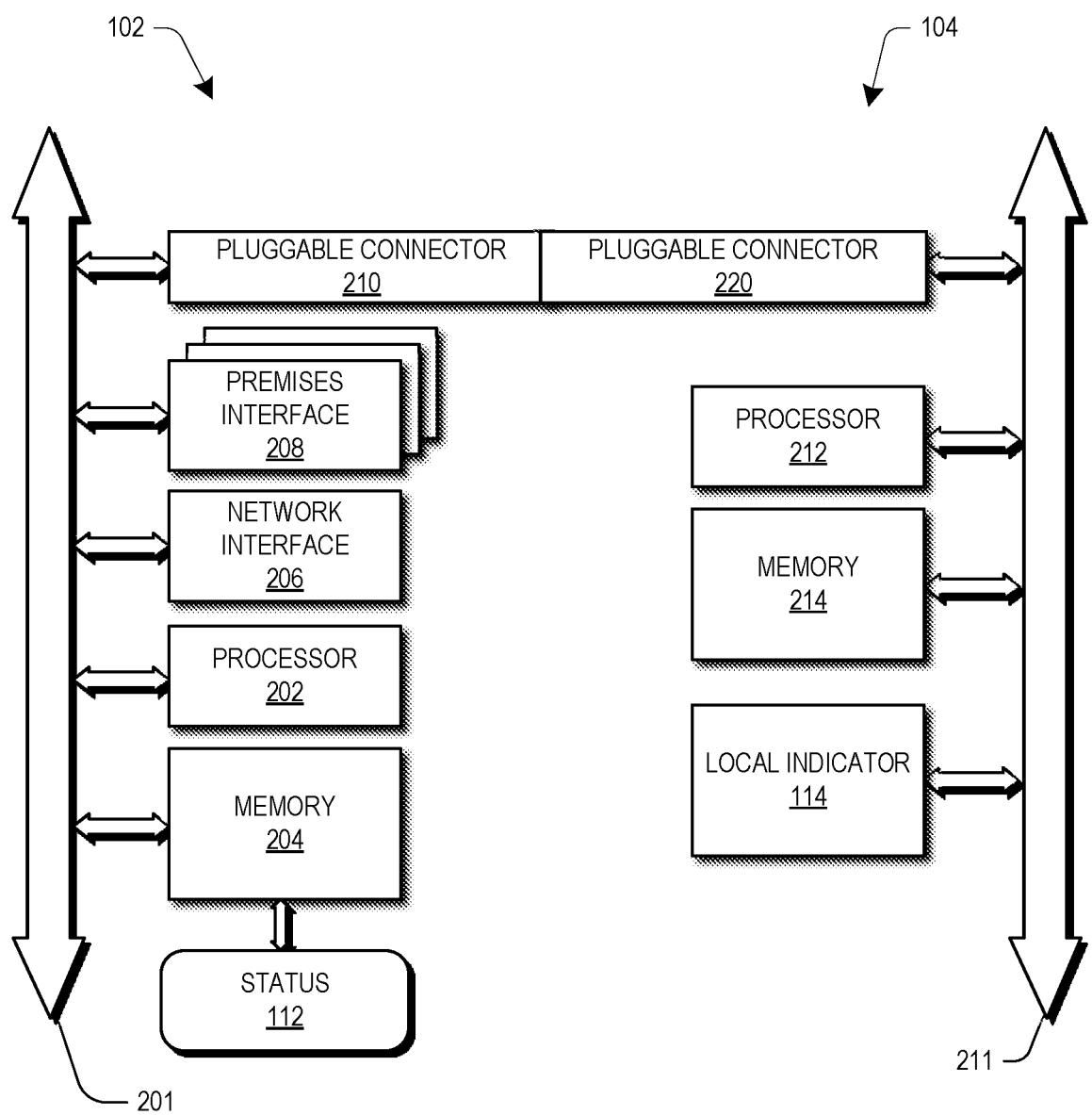
FIG. 2 is a diagram of a host device interfacing with a pluggable network communication device, according to some embodiments.

FIG. 2 is a diagram of the network communication device 102 interfacing with the host device 104. In some embodiments, the network communications device 102 comprises a bus 201, a processor 202, a memory 204 comprising the status memory 112, a network interface 206, and a pluggable connector 210. In some embodiments, the host device 104 comprises a bus 211, a processor 212, a memory 214, the local indicator 114, and a pluggable connector 220. In some embodiments, the pluggable connector 210 is a male connector and the pluggable connector 220 is a receptacle. The network communication device 102 and the host device 104 may include fewer components, additional components, different components, and/or a different arrangement of components than those illustrated in FIG. 2.

According to some embodiments, the buses 201, 211 include paths that permit communication among the components of the network communication device 102 and the host device 104, respectively. For example, the bus 201, 211 may include a system bus, an address bus, a data bus, and/or a control bus. The bus 201, 211 may also include bus drivers, bus arbiters, bus interfaces, and so forth. The processors 202, 212 include one or multiple processors, microprocessors, data processors, co-processors, such as a mathematics coprocessor or an integrated graphical processing unit (GPU), one or more layers of local cache memory, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processors 202, 212 may be implemented as hardware (e.g., a microprocessor, etc.), a combination of hardware and software (e.g., a SoC, an ASIC, etc.), may include one or multiple memories (e.g., cache, etc.), etc. The processors 202 may be different than the processor 212. For example, one of the processors 202, 212 may have increased functionality compared to the other processor 202, 212.

In some embodiments, the memories 204, 214 each includes one or multiple memories and/or one or multiple other types of storage mediums. For example, the memories 204, 214 may include one or multiple types of memories, such as, random access memory (RAM), dynamic random access memory (DRAM), cache, read only memory (ROM), programmable read only memory (PROM), static random access memory (SRAM), flash memory, and/or some other suitable type of memory. The memory 214 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The memories 204, 214 may include drives for reading from and writing to the storage medium. The memory 214 may be external to and/or removable, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memories 204, 214 may store data, software, and/or instructions. The memory 204 may differ in type and capacity compared to the memory 214.

In some embodiments, the processors 202, 212 control the overall operation or a portion of the operation(s) of the network communication device 102 and the host device 104, respectively. The processors 202, 212 perform one or multiple operations based on an operating system and/or various applications or computer programs (e.g., software).

In some embodiments, the network interface 206 comprises an optical network interface and the wide-area network 106 comprises an optical network. The pluggable connector 210 provide a host-facing interface for interfacing with the host device 104.

Figure 3:
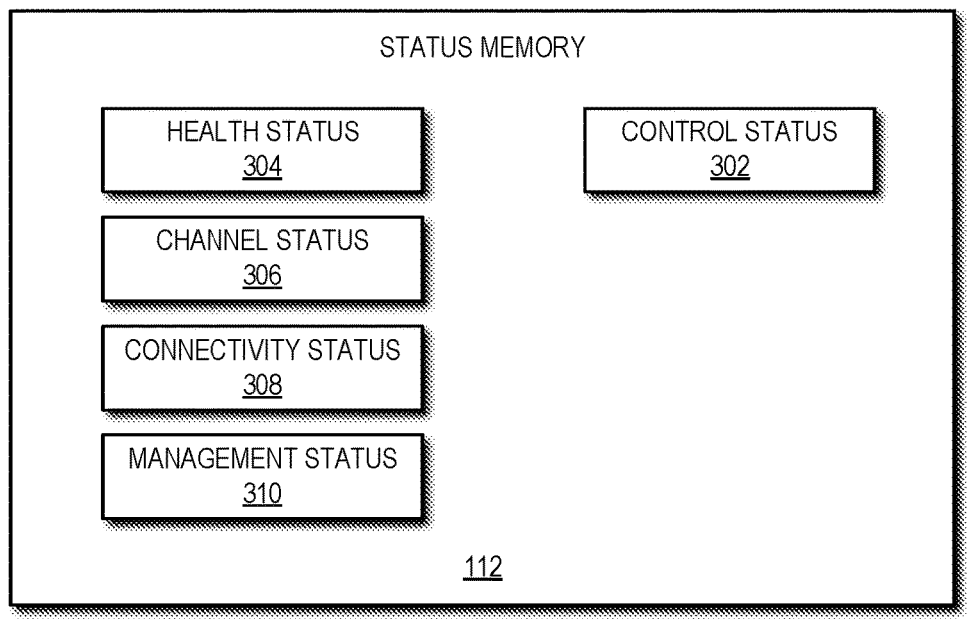
FIG. 3 is a diagram of status fields for a network communication device, according to some embodiments.

FIG. 3 is a diagram of an example of the status memory 112 in the network communication device 102, according to some embodiments. Operationally, the status of the network communication device 102 stored in the status memory 112 is represented by a control status field 302, a health status field 304, a channel status field 306, a connectivity status field 308, and a management status field 310. In some embodiments, the network communication device 102 uses the control status field 302 to moderate access to the other status fields 304, 306, 308, 310 in the status memory 112, for example, to prevent access when the status memory 112 is being updated or read. Fewer, additional, or other status fields are within the scope of the present disclosure.

The values in the status fields 304, 306, 308, 310 may be thought of as representing "virtual LED" codes. The codes are virtual in the sense that the network communication device 102 does not include sufficient housing space to provide physical LEDs to indicate status as reflected in these fields, but instead the values in the status fields 304, 306, 308, 310 may be provided to the host device 104 to allow the status data to be shown on the local indicator 114 of host device 104. The "virtual LED" terminology is used herein to refer to one or more of the status fields 304, 306, 308, 310.

In some embodiments, the network communication device 102 communicates the status fields 304, 306, 308, 310 in the status memory 112 to the host device 104, and the host device 104 provides the status data representing virtual LED codes on the local indicator 114. Providing a visualization of the status of the network communication device 102 using the local indicator 114 is useful for troubleshooting purposes. In some embodiments, the network communication device 102 communicates the status information to the host device 104 over the pluggable connector 210. The local indicator 114 may be a set of LEDs, a display, or some other indication device. LED patterns, colors, or flashing status may vary depending on the values stored in the status fields 304, 306, 308, 310. For example, error states may be indicated by one or more flashing LEDs. In an embodiment, where the local indicator 114 is a display, a text message may be provided to indicate the value of the virtual LED codes. In some embodiments, the local indicator 114 comprises a button or other user input device that allows a user to scroll through different status fields 304, 306, 308, 310. In some embodiments, the host device 104 periodically cycles through the status fields 304, 306, 308, 310 when providing the status information on the local indicator 114. In an embodiment, where the local indicator 114 comprises LEDs and does not display the status of all of the status fields 304, 306, 308, 310 at once, the LEDs may be organized into a set of field LEDs (e.g., two LEDs for four status fields 304, 306, 308, 310) and a set of status LEDs that indicate the status (e.g., eight LEDs for status values from 0x00 to 0xFF).

Other numbers and arrangements of LEDs are within the scope of the present disclosure.

The following examples illustrate status data for a network communication device 102 operating in an application where the wide-area network 106 is an optical network, for example, an NG-PON2 network. However, the examples described herein can be equally applied to other applications using other network topologies.

In one example implementation: the health status field 304 indicates the system status of the network communication device 102, including its hardware and software; the channel status field 306, represents the physical layer state of the network communication device 102, specifically its operating wavelength channel; the connectivity status field 308 represents the transmission convergence (TC) layer connectivity of the network communication device 102, more specifically, the activation cycle state; and the management status field 310 represents the management connectivity status of the network communication device 102.

Tables 1-4 illustrate example values for the health status field 304, the channel status field 306, the connectivity status field 308, and the management status field 310, respectively.

TABLE 1

Health Status

| NCD system status | Virtual LED Code |
| --- | --- |
| System on | 0x01 |
| Booting/updating system | 0x02 |
| Hardware failure | 0x08 |

TABLE 2

Channel Status

| Upstream wavelength channel | Virtual LED Code |
| --- | --- |
| Searching for a channel | 0xFF |
| Channel 1 - 195.6 GHZ | 0x01 |
| Channel 2 - 195.5 GHZ | 0x02 |
| Channel 3 - 195.4 GHZ | 0x04 |
| Channel 4 - 195.3 GHZ | 0x08 |

TABLE 3

Connectivity Status

| TC layer activation cycle status | Virtual LED Code |
| --- | --- |
| O5 - TC layer in normal operating state | 0x01 |
| O1.1 - TC layer is down (searching for optical signal) | 0xFF |
| O1.2, O2-3, O4, O8.2, O9 - TC layer is activating (optical signal has been found) | 0x02 |
| O6, O8.1 - TC layer is intermittently non-operative | 0x04 |
| O7 - TC layer is suppressed (emergency stop state) | 0x08 |

TABLE 4

Management Status

| OMCI connectivity status | Virtual LED Code |
| --- | --- |
| Provisioning complete | 0x01 |
| Provisioning in process | 0x02 |

TABLE 4-continued

Management Status

| OMCI connectivity status | Virtual LED Code |
| --- | --- |
| Provisioning failure | 0x04 |
| OMCC channel down | 0x08 |

Some aspects of the operational status of a conventional network communication device implemented as a stand-alone device (rather than pluggable), such as unsupported optical module, may not be applicable for the pluggable network communication device 102 described herein, so they are excluded from the tables above. In some embodiments, these states may be included as possible states to provide compatibility with conventional deployments, but these states may never be indicated.

The control status field 302 reflects status information of the semantics for read/write access to the status memory 112, as shown in Table 5.

TABLE 5

Control Status

| Control status | Semantics | Owner | Code |
| --- | --- | --- | --- |
| DIS-ABLED | Initial state; the NCD 102 has invited the host device 104, but the host device 104 has not yet confirmed its support of the Virtual LED function. | Module | 0xA5 |
| READY | The NCD 102 and the host device 104 have completed a Virtual LED function handshake; the host device 104 is ready to retrieve new status information once the NCD 102 indicates the status has changed. | Host | 0x01 |
| BUSY | The NCD 102 is writing to the status memory 112, blocking access by the host device 104. | Module | 0x02 |
| CHANGE | The NCD 102 has written new status information into the status memory 112, which is available for the host device 104 to retrieve. | Module | 0x04 |
| ACTIVE | The host device 104 is reading the status memory 112, blocking access by the NCD 102. | Host | 0x08 |

At the physical layer, the status fields 304, 306, 308, 310 may be obtained by the host device 104 from the network communication device 102 through a signaling procedure supported by the host interface implemented by the pluggable connectors 210, 220. In some embodiments, the network communication device 102 uses an SFP+ form factor, which specifies a 20-pin electrical connector as the host interface, with each pin have a defined function to support data transmission or operation and maintenance (O&M) function. For example, according to the SPF+ specification, pins 4-5 provide a low-speed 2-wire serial data interface using the Inter-Integrated Circuit (I2C) protocol to allow for the exchange of out-of-band data between the network communication device 102 and the host device 104. In some embodiments, pin 9, which is designated by the SFP+ specification as a receiver ground pin, is repurposed to serve as a signaling path for status information transactions. The network communication device 102 may indicate that the status information has changed by changing the status of the signal being sent through pin 9 (e.g., from 3.3V to 0V, or from 0V to 3.3V). This change in status may be detected by the host device 104 and interpreted as a signal to retrieve status information from the status memory 112 using the low-speed serial data interface on pins 4 and 5. For other form factors, other pins may be used, or other mechanisms may be used for signaling the availability of status information may be used. In some embodiments, the network communication device 102 informs the host device 104 that the status information has changed. In some embodiments, the host device 104 polls the network communication device 102 to retrieve the status information.

In some embodiments, the host device 104 implements an interfacing system that allows for access to the status information of the network communication device 102 over the host-facing interface implemented by the pluggable connectors 210, 220. For example, in some embodiments, the host device 104 uses a programmable logic array to connect to the pluggable connector 220 and send/receive the signals over the pins described above. The programmable logic array may be accessible to the processor 212 of the host device 104 through a memory bus (e.g., memory mapped into the address space of the memory 214) or through an I/O bus (e.g., port mapped into the I/O space of the host device 104). The host device 104 may then issue instructions to access the status memory 112 of the network communication device 102 that cause the programmable logic array to issue signals over the appropriate pins, and read signals over the appropriate pins. The programmable logic array may include storage (e.g., memory), that allows for storage of status and control values received from the network communication device 102, which allows for interfacing with the processor 212 over its bus architecture, which may be useful where the processor 212 bus architecture is parallel and the host-facing interface uses serial communications.

Figure 4:
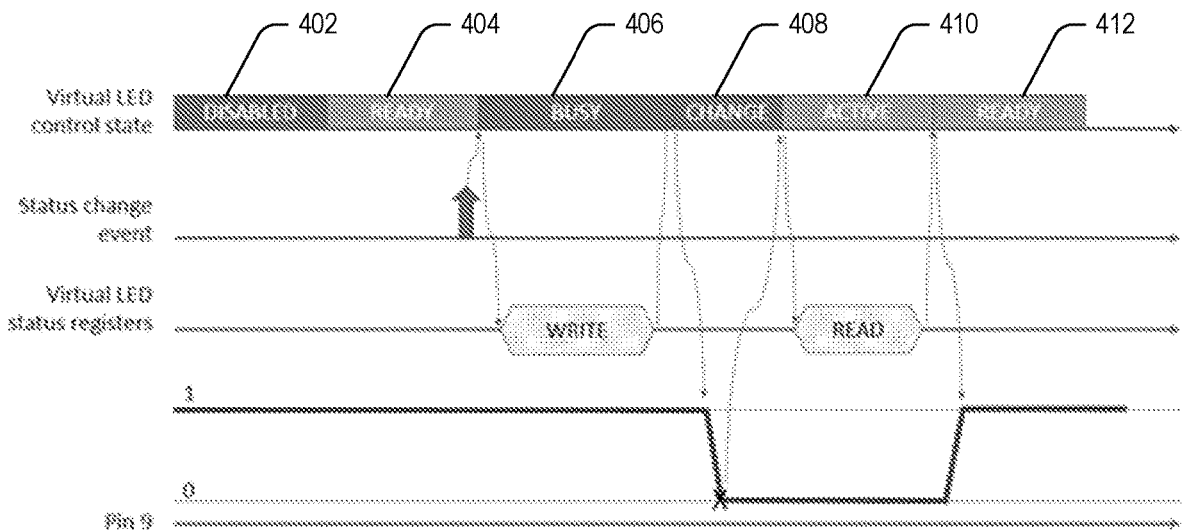
FIG. 4 is a timing diagram illustrating the accessing of a status memory, in accordance with some embodiments.

Referring to FIG. 4, a timing diagram 400 illustrating the accessing of the status memory 112 is provided, in accordance with some embodiments. Responsive to a reboot of the host device 104 or an insertion of the network communication device 102 into the host via the pluggable connector 210, the network communication device 102 module initially sets the control status field 302 to DISABLED (e.g. 0xA5) at 402. The host device 104 may initiate Virtual LED operation by setting the control status field 302 to the READY state (e.g., 0x01) at 404, thus indicating to the network communication device 102 that the host device 104 is capable of receiving and displaying the Virtual LED information.

When the status of the network communication device 102 changes such that an update of any of the status fields 302, 304, 306, 308 needs to be made, the network communication device 102 sets control status field 302 to a BUSY state at 406 while the network communication device 102 writes to the status fields 302, 304, 306 and/or 308 in status memory 112. The network communication device 102 sets the control status field 302 to indicate a status of CHANGE at 408 after the write is complete. The network communication device 102 also signals the host device 104 at 408 when a change occurs in the values of the status fields 302, 304, 306, 308. Upon a change in status, the network communication device 102 changes the signal level of pin 9 (e.g., pulling to the high or low value). The host device 104 detects the change in the pin 9 signal level, and checks the control status field 302 to determine if the status memory 112 is readable. The host device 104 then sets the control status field 302 to ACTIVE at 410, indicating that a read by the host device 104 is being conducted. Upon completion of the read operation, the host device 104 sets the control status field 302 to the READY state at 412 to indicate that the status memory 112 is available for read or write operations. The host device 104 updates the local indicator 114 to reflect the status change. In some embodiments, the host device 104 may also provide an audible indicator when a state change is displayed.

In one example, the network communication device 102 controls the signaling pin (e.g., pin 9) to indicate state changes. In some embodiments, the host device 104 periodically requests the status of the network communication device 102. In some embodiments, the host device 104 controls the signaling pin. To implement a status request, the host device 104 changes the signal level of pin 9 (e.g., pulling to the high or low value). The network communication device 102 detects the change in the pin 9 signal level, and checks the control status field 302 to determine if the status memory 112 is readable. If the control status field 302 indicates a BUSY state, the network communication device 102 is in the process of updating the status fields 304, 306, 308, 310. The network communication device 102 will wait until updating is complete and the control status field 302 indicates the status CHANGE (which the network communication device 102 sets after updating the status values). The network communication device 102 sets the control status field 302 to ACTIVE, indicating that a host device 104 read is being conducted, reads the contents of the status fields 304, 306, 308, 310 and sends the status data over the low-speed serial data interface. Upon completion of the read operation, the network communication device 102 sets the control status field to the READY state to indicate that the status memory 112 is available for read or write operations.

Figure 5:
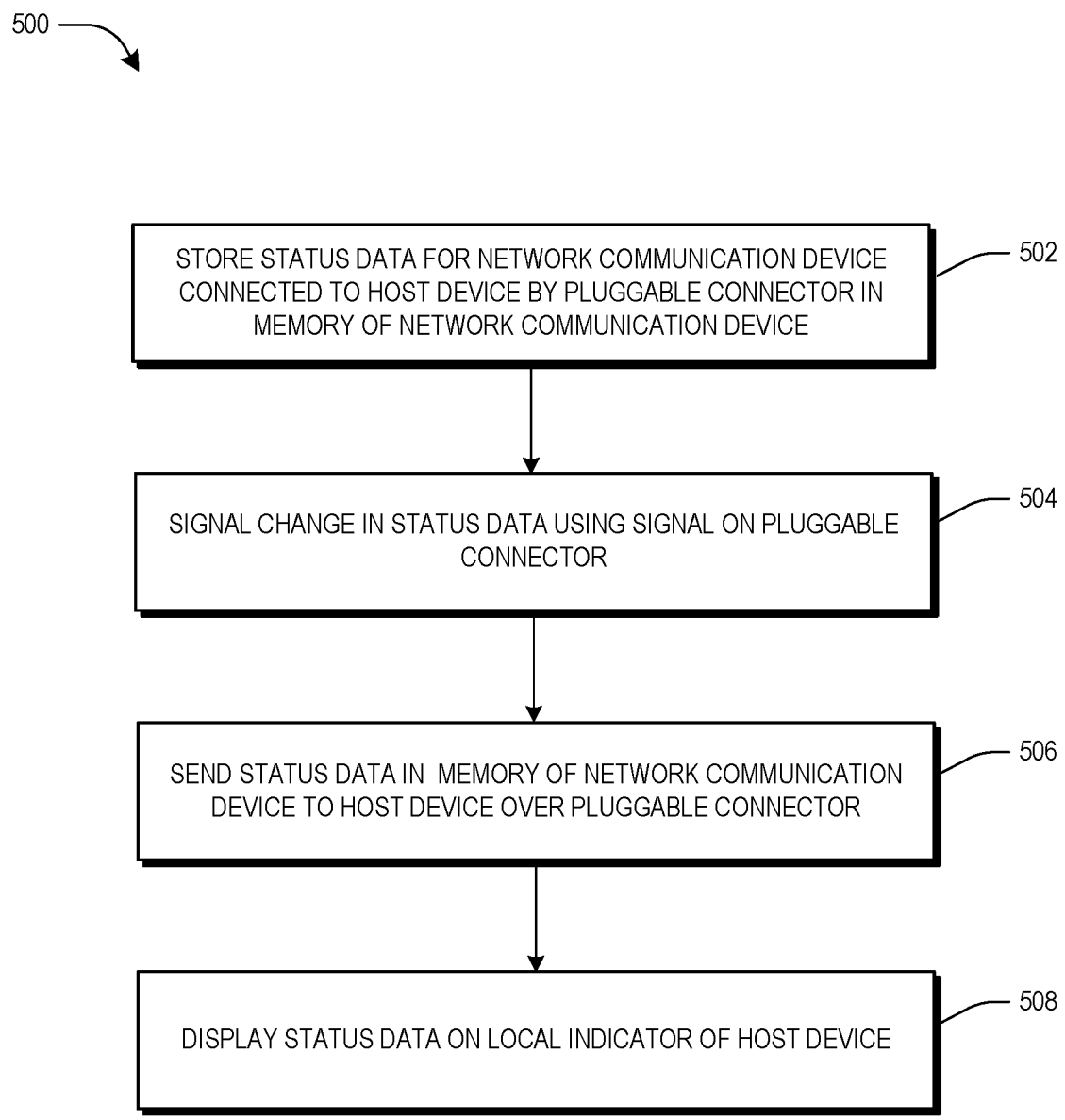
FIG. 5 is a flow diagram illustrating an example method for providing remote status indicators for a pluggable device, according to some embodiments.

FIG. 5 is a flow diagram illustrating an example method 500 for providing remote status indicators for a pluggable device, according to some embodiments. At 502, status data for a network communication device 102 connected to a host device 104 by a pluggable connector 210, 220 is stored in a memory 204 of the network communication device 102. At 504, a change in the status data is signaled using a signal on the pluggable connector 210, 220. At 506, the status data in the memory 204 of the network communication device 102 is sent to the host device 104 over the pluggable connector 210, 220. At 508, the status data is displayed on a local indicator 114 of the host device 104.

Figure 6:
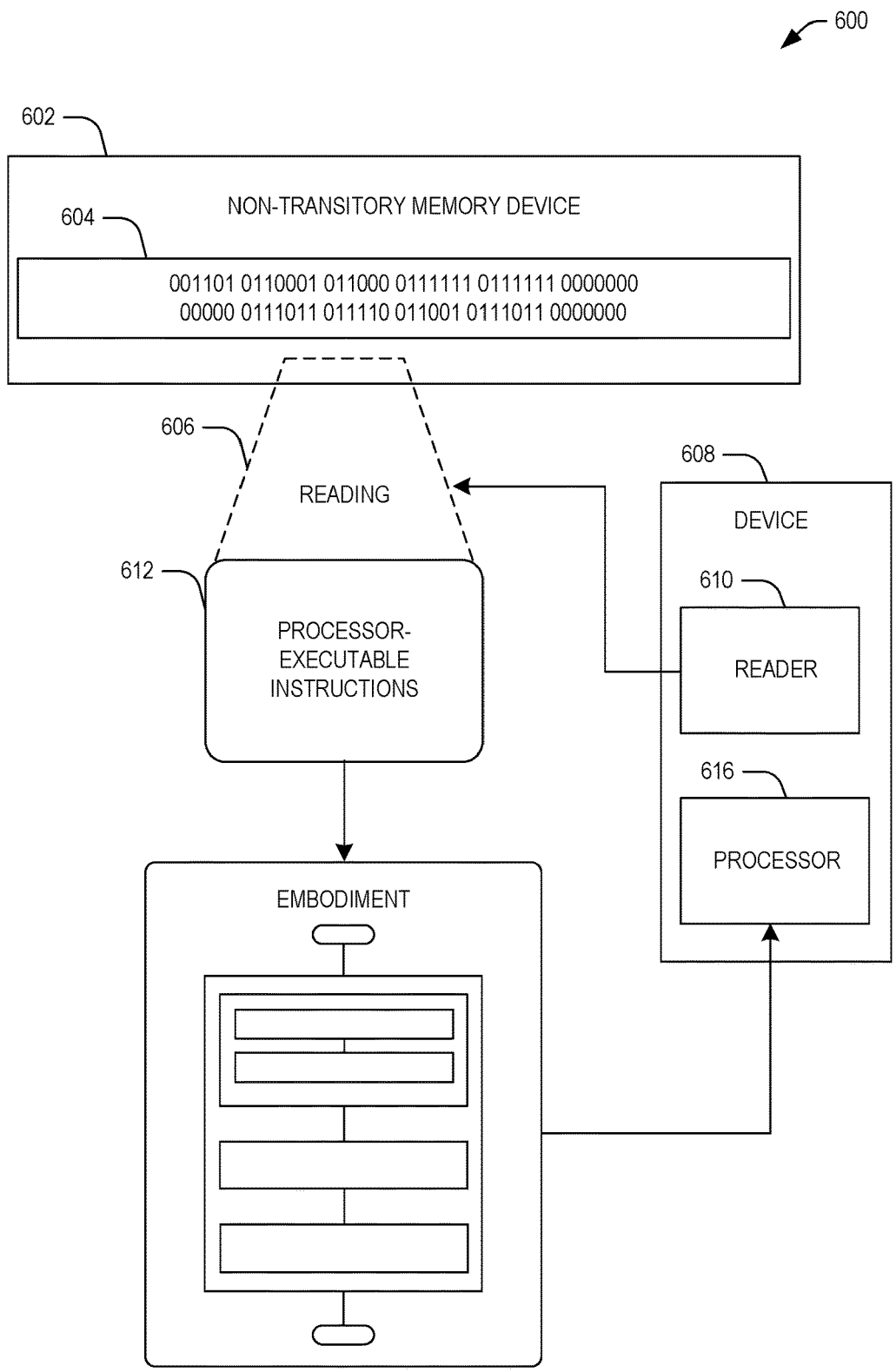
FIG. 6 is an illustration of a scenario featuring an example non-transitory machine readable medium in accordance with one or more of the provisions set forth herein.

FIG. 6 is an illustration of a scenario 600 involving an example non-transitory machine-readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor device (e.g., a semiconductor device utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine-readable medium 602 stores machine-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example methods of FIGS. 4-8, for example. In some embodiments, the processor-executable instructions 612 are configured to cause implementation of a system.

Using the local indicator 114 on host device 104 to display status data for the network communication device 102 allows a technician to monitor the network communication device 102 even though the network communication device 102 has a small form factor that precludes indicators.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    storing status data for a network communication device connected to a host device by a pluggable connector in a memory of the network communication device;
    storing a control status field in the memory;
    controlling access to the memory based on the control status field;
    signaling a change in the status data for the network communication device using a signal on the pluggable connector;
    sending the status data for the network communication device stored in the memory of the network communication device to the host device over the pluggable connector; and
    displaying the status data for the network communication device on a local indicator of the host device.

2. The method of claim 1, wherein displaying the status data on the local indicator comprises at least one of:
    displaying the status data using an LED indicator on the host device, or
    displaying the status data on a display of the host device.

3. The method of claim 1, wherein signaling the change in the status data comprises:
    changing a value of a signal on a pin of the pluggable connector.

4. The method of claim 1, wherein the pluggable connector is an SPF+connector, and sending the status data to the host device over the pluggable connector includes using an I2C protocol.

5. The method of claim 1, wherein controlling access to the memory based on the control status field comprises:
    controlling access to one or more status fields stored in the memory, other than the control status field, based on the control status field.

6. The method of claim 1, wherein sending the status data to the host device over the pluggable connector comprises:
    sending the status data using a serial interface.

7. The method of claim 1, wherein storing the status data comprises:

storing at least one of a health status field, a channel status field, a connectivity status field, or a management status field.

8. A system, comprising:
a network communication device, comprising:
a memory;
a first processor; and
a first connector; and
a host device, comprising:
a local indicator;
a second connector removably pluggable with the first connector; and
a second processor,
wherein:
the first processor is configured to store a control status field in the memory, control access to the memory based on the control status field, store status data for the network communication device in the memory, signal a change in the status data for the network communication device to the second processor using a signal on the first connector that is plugged to the second connector; and send the status data for the network communication device to the second processor over the first connector that is plugged to the second connector; and
the second processor is configured to display the status data for the network communication device on the local indicator.

9. The system of claim 8, wherein:
the local indicator comprises at least one of a light emitting diode, or a display.

10. The system of claim 8, wherein:
the first processor is configured to signal the change in the status data by changing a value of a signal on a pin of the first connector.

11. The system of claim 8, wherein the first connector is an SPF+connector, and the first processor is configured to send the status data to the host device over the first connector using an I2C protocol.

12. The system of claim 8, wherein controlling access to the memory based on the control status field comprises:
controlling access to one or more status fields stored in the memory, other than the control status field, based on the control status field.

13. The system of claim 8, wherein:
the first processor is configured to send the status data to the host device over the first connector using a serial interface between the first connector and the second connector.

14. The system of claim 8, wherein:
the status data comprises at least one of a health status field, a channel status field, a connectivity status field, or a management status field.

15. The system of claim 8, wherein:
the network communication device comprises an optical interface, and
the first connector comprises a host interface.

16. A network communication device, comprising:
a memory;
an optical network interface;
a pluggable connector implementing a host interface; and
a processor configured to:
store status data for the network communication device in the memory;
store a control status field in the memory;
control access to the memory based on the control status field;
signal a change in the status data for the network communication device using a signal on the pluggable connector; and
send the status data for the network communication device over the pluggable connector.

17. The network communication device of claim 16, wherein:
the processor is configured to signal the change in the status data by changing a value of a signal on a pin of the pluggable connector.

18. The network communication device of claim 16, wherein controlling access to the memory based on the control status field comprises:
controlling access to one or more status fields stored in the memory, other than the control status field, based on the control status field.

19. The network communication device of claim 16, wherein:
the processor is configured to send the status data over the pluggable connector using a serial interface.

20. The network communication device of claim 16, wherein:
the status data comprises at least one of a health status field, a channel status field, a connectivity status field, or a management status field.

* * * * *